United States Patent
Wu et al.

(10) Patent No.: US 11,784,929 B2
(45) Date of Patent: Oct. 10, 2023

(54) HETEROGENEOUS LINK DATA TRANSLATION AND DISTRIBUTION METHOD, SYSTEM AND DEVICE, AND STORAGE MEDIUM

(71) Applicant: REMO TECH CO., LTD., Guangdong (CN)

(72) Inventors: Yanlong Wu, Guangdong (CN); Liang Li, Guangdong (CN)

(73) Assignee: REMO TECH CO., LTD.

( * ) Notice: Subject to any disclaimer, the term of this patent is extended or adjusted under 35 U.S.C. 154(b) by 64 days.

(21) Appl. No.: 17/606,086

(22) PCT Filed: Oct. 12, 2019

(86) PCT No.: PCT/CN2019/110891
§ 371 (c)(1),
(2) Date: Oct. 25, 2021

(87) PCT Pub. No.: WO2021/027047
PCT Pub. Date: Feb. 18, 2021

(65) Prior Publication Data
US 2022/0200905 A1    Jun. 23, 2022

(30) Foreign Application Priority Data
Aug. 9, 2019 (CN) .......................... 201910734387.6

(51) Int. Cl.
*H04L 45/741*  (2022.01)
*H04L 45/121*  (2022.01)
*H04L 69/08*   (2022.01)

(52) U.S. Cl.
CPC .......... *H04L 45/741* (2013.01); *H04L 45/121* (2013.01); *H04L 69/08* (2013.01)

(58) Field of Classification Search
CPC ...... H04L 45/121; H04L 45/741; H04L 69/08
See application file for complete search history.

(56) References Cited

U.S. PATENT DOCUMENTS

| 2005/0213574 A1 | 9/2005 | Yoshimura et al. |
| 2007/0266432 A1 | 11/2007 | Hara et al. |

(Continued)

FOREIGN PATENT DOCUMENTS

| CN | 1722729 | 1/2006 |
| CN | 101141419 | 3/2008 |

(Continued)

OTHER PUBLICATIONS

Patent Cooperation Treaty (PCT), International Search Report and Written Opinion for Application PCT/CN2019/110891 filed on Oct. 12, 2019, dated May 8, 2020, International Searching Authority, CN.

(Continued)

*Primary Examiner* — Mansour Oveissi
(74) *Attorney, Agent, or Firm* — McDonald Hopkins LLC

(57) ABSTRACT

Provided are a heterogeneous link data translation and distribution method, system, device and a storage medium. The heterogeneous link data translation and distribution method includes: original data sent by a first device in a heterogeneous link is received; a heterogeneous link routing table is queried according to the original data to obtain routing information and data protocol information of a second device to be connected to the first device; the original data is translated into data to be distributed conforming to the data protocol information of the second device; and the data to be distributed is sent to the second device according to the routing information of the second device.

10 Claims, 3 Drawing Sheets

(56) References Cited

U.S. PATENT DOCUMENTS

2011/0038274 A1* 2/2011 Ikemoto ............... H04W 40/30
                                                      370/252
2013/0315232 A1  11/2013 Desai et al.
2019/0020622 A1*  1/2019 Novo Diaz ......... H04L 61/4541

FOREIGN PATENT DOCUMENTS

| CN | 101420386 | 4/2009 |
| CN | 101471877 | 7/2009 |
| CN | 102479182 | 5/2012 |
| CN | 102694739 | 9/2012 |
| CN | 102938731 | 2/2013 |
| CN | 103839138 | 6/2014 |
| CN | 103839139 | 6/2014 |
| CN | 104038414 | 9/2014 |
| CN | 105516185 | 4/2016 |
| CN | 107241379 | 10/2017 |
| CN | 107528864 | 12/2017 |
| CN | 108521378 | 9/2018 |
| EP | 2587725 | 5/2013 |

OTHER PUBLICATIONS

State Intellectual Property Office of People's Republic of China, Search Report for Application No. 201910734387.6, China.
State Intellectual Property Office of People's Republic of China, Notification of First Office Action for Application No. 201910734387.6, report dated Apr. 9, 2020, China.
State Intellectual Property Office of People's Republic of China, Supplementary Search Report for Application No. 201910734387.6, China.

* cited by examiner

HETEROGENEOUS LINK DATA TRANSLATION AND DISTRIBUTION METHOD, SYSTEM AND DEVICE, AND STORAGE MEDIUM

CROSS REFERENCE TO RELATED APPLICATIONS

This application is a 35 U.S.C. 371 national stage filing of PCT Application No. PCT/CN2019/110891 filed on Oct. 12, 2019, which claims priority to Chinese Patent Application No. 201910734387.6 filed with the CNIPA on Aug. 9, 2019, the disclosures of which are incorporated herein by reference in their entireties.

TECHNICAL FIELD

Embodiments of the present disclosure relate to network technologies, and for example, to a heterogeneous link data translation and distribution method, system, device and a storage medium.

BACKGROUND

A data network composed of various devices meeting different standards and systems is referred to as a heterogeneous network, and a data transmission link in the heterogeneous network is referred to as a heterogeneous link. When a data transmission is carried out between devices in the heterogeneous link, data of different systems need to be converted. A data concentrator is generally adopted in a data access mode of a current heterogeneous link, a device of various heterogeneous links is connected to the data concentrator, and the data concentrator converts data and transmits the data to other devices.

However, all data in the heterogeneous link is input into the data concentrator to be converted, so that the data transmission delay is increased, the data load of the data concentrator is greatly increased along with increasing of the number of access devices, and thus the expansion of the devices and the expansion of the data are inconvenient.

SUMMARY

The present disclosure provides a heterogeneous link data translation and distribution method, system, device and a storage medium, which improves the expansion capability of the heterogeneous link data translation and distribution.

In a first aspect, an embodiment of the present disclosure provides a heterogeneous link data translation and distribution method. The heterogeneous link data translation and distribution method includes: original data sent by a first device in a heterogeneous link is received; a heterogeneous link routing table is queried according to the original data to obtain routing information and data protocol information of a second device to be connected to the first device; the original data is translated into data to be distributed conforming to the data protocol information of the second device; and the data to be distributed is sent to the second device according to the routing information of the second device.

In a second aspect, an embodiment of the present disclosure further provides a heterogeneous link data translation and distribution system. The heterogeneous link data translation and distribution system includes a receiving module, a querying module, a translation module and a distribution module. The receiving module is configured to receive original data sent by a first device in a heterogeneous link. The querying module is configured to query a heterogeneous link routing table according to the original data to obtain routing information and data protocol information of a second device to be connected to the first device. The translation module is configured to translate the original data into data to be distributed conforming to the data protocol information of the second device. The distribution module is configured to send the data to be distributed to the second device according to the routing information of the second device.

In a third aspect, an embodiment of the present disclosure further provides a heterogeneous link data translation and distribution device. The heterogeneous link data translation and distribution device includes one or more processors and a storage apparatus configured to store one or more programs. The one or more programs, when executed by the one or more processors, cause the one or more processors to implement the heterogeneous link data translation and distribution method as described in either of possible implementations of the first aspect.

In a fourth aspect, an embodiment of the present disclosure further provides a non-transitory computer readable storage medium, having stored thereon a computer program. The program, when executed by a processor, implements the heterogeneous link data translation and distribution method as described in either of possible implementations of the first aspect.

DETAILED DESCRIPTION

Figure 1:
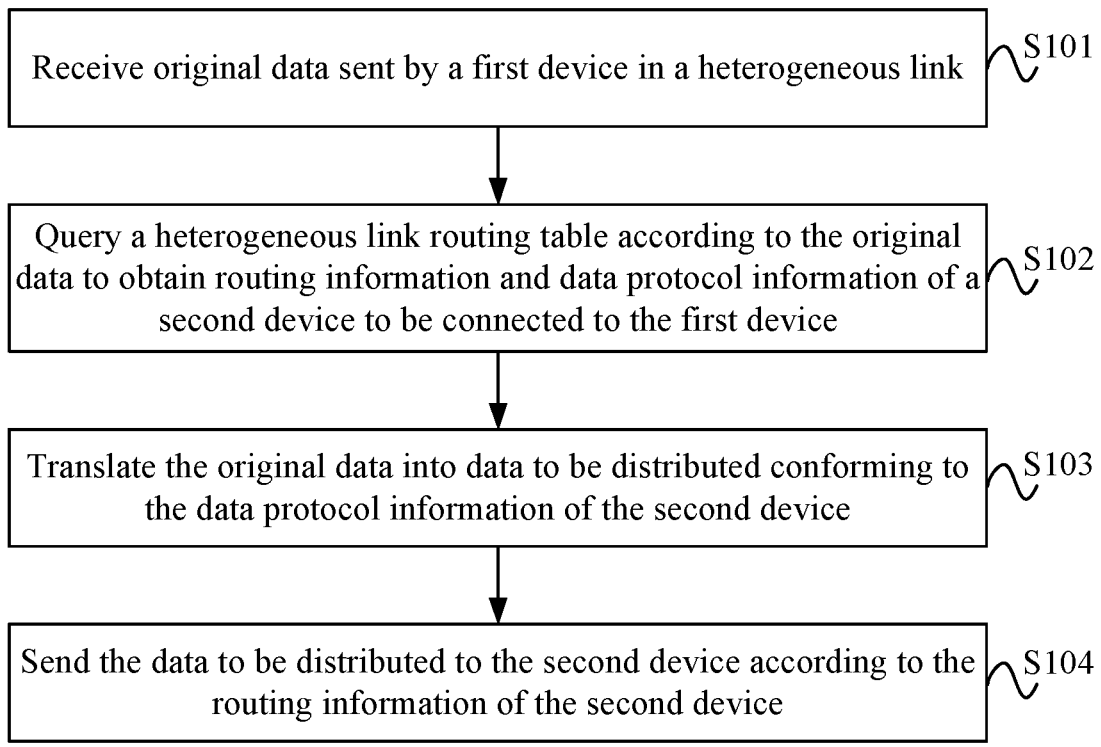
FIG. 1 is a flowchart of a heterogeneous link data translation and distribution method provided in an embodiment of the present disclosure.

The present application will be further described in detail in conjunction with the drawings and embodiments below. It should be understood that the specific embodiments described herein are merely used for explaining the present application and are not intended to limit the present application. It should also be noted that, for ease of description, only some, but not all, of the structures related to the present application are shown in the drawings.

FIG. 1 is a flowchart of a heterogeneous link data translation and distribution method provided in an embodiment of the present disclosure, and as shown in FIG. 1, the heterogeneous link data translation and distribution method provided in this embodiment includes described below.

In step S101, original data sent by a first device in a heterogeneous link is received.

With the improvement of the system integration degree, various devices with different standards and systems have the requirement of interconnection and intercommunication, but data transmitted by the devices with different standards and systems are data conforming to different standards and systems, and because of different data structures, the devices with different standards and systems cannot be directly connected together, but the interconnection and the intercommunication among the devices can be realized only by performing a protocol conversion on the data after the connection is performed through an intermediate protocol conversion device. However, it is very costly to develop a corresponding protocol conversion device for each pair of devices with different standards and systems, and it is not suitable for an integrated device that integrates multiple standards and systems. Therefore, in the related art, a data concentrator is mainly adopted as a data conversion device between devices with various standards and systems. However, the data concentrator firstly needs to cache and download the received data sent by the devices with different standards and systems, and then converts the data by a pre-stored data conversion method between different data protocols to complete the data forwarding, which cannot meet the conversion requirements of multiple concurrent data on one hand, and is not convenient for device expansion on the other hand.

Therefore, in this embodiment, a heterogeneous link data translation and distribution method is provided, firstly, the original data sent by the first device in the heterogeneous link is received, where the original data is sent by the first device and conforms to a first data protocol corresponding to the first device. A destination address of the original data is a second device connected in the heterogeneous link, and a data protocol of the second device is different from the first data protocol, so that the original data cannot be directly sent to the second device and needs to be processed. The heterogeneous link is a data transmission system formed by connecting devices conforming to various data protocols, and the various data protocols include: a common on-board communication bus such as a serial peripheral interface (SPI), an inter-integrated circuit bus (IIC); an inter-board communication bus such as a secure digital input and output (SDIO), a universal serial bus (USB); an industrial communication bus such as a universal asynchronous receiver/transmitter (UART), a controller area network (CAN); and a wireless communication means such as WiFi, bluetooth, zigbee. A data transmission link formed by connecting at least two devices conforming to different data protocols is referred to as the heterogeneous link.

The heterogeneous link data translation and distribution method provided in this embodiment realizes the translation and distribution of data through a heterogeneous link data translation and distribution system.

In S102, a heterogeneous link routing table is queried according to the original data to obtain routing information and data protocol information of a second device to be connected to the first device.

In order to realize the data forwarding in the heterogeneous link, in this embodiment, the heterogeneous link routing table is established in the heterogeneous link data translation and distribution system, and routing information and data protocol information of a device connected in the heterogeneous link are stored in the heterogeneous link routing table. The heterogeneous link routing table is independently stored in the heterogeneous link data translation and distribution system and may be updated at any time. Each device in the heterogeneous link has corresponding routing information and data protocol information in the routing table, when a new device is accessed into the heterogeneous link, the heterogeneous link routing table needs to be updated, and routing information and data protocol information corresponding to a newly accessed device are added into the heterogeneous link routing table.

The routing information and the data protocol information corresponding to each device in the heterogeneous link routing table may be in a form shown in table 1, for example.

TABLE 1

| Device Description | Primary device number | Secondary device number | Device attributes MAC address IP address Port | Data protocol type |
|---|---|---|---|---|

In table 1, the device description may be proprietary attributes of the device such as a device name, a device number, the primary device number is used for distinguishing different types of devices, for example, a primary classification number of a gimbal is the same, and the secondary device number is used for distinguishing multiple gimbals of a same type, for example, the secondary device numbers of different gimbals are different. The device attributes are proprietary attributes used for characterizing different types of devices. The media access control (MAC) address, the internet protocol (IP) address, and the port are all routing information of a device, and a position of the device in a data network may be determined through one or more pieces of routing information for the data forwarding. The data protocol type is used for representing the data protocol type corresponding to the device.

After the original data sent by the first device in the heterogeneous link is received, the original data is parsing to obtain the destination address of the original data, and corresponding information of the second device in the heterogeneous link routing table may be determined by querying the routing information in the heterogeneous link routing table; meanwhile, a source address may be acquired from the original data, and corresponding information of the first device in the heterogeneous link routing table may be determined by querying the routing information in the heterogeneous link routing table. Therefore, data protocol types respectively corresponding to the first device and the second device may be obtained by querying the heterogeneous link routing table.

In step S103, the original data is translated into data to be distributed conforming to the data protocol information of the second device.

Protocol parsing codes among data protocols are further stored in the heterogeneous link data translation and distribution system, and after data protocol types corresponding to the first device and the second device are determined, the protocol parsing codes corresponding to data conversion from the first device to the second device are inquired; and then, the original data may be translated into the data to be distributed corresponding to the data protocol type conforming to the second device through the protocol parsing codes.

In S104, the data to be distributed is sent to the second device according to the routing information of the second device.

After the original data is translated into the data to be distributed, the data to be distributed may be distributed to the second device according to the routing information of the second device obtained through query of the heterogeneous link routing table, and therefore the translation and distribution of the data in the heterogeneous link are realized.

In this embodiment, only the data translation and distribution method of the original data sent by the first device to the second device in a heterogeneous link is shown, and in the heterogeneous link, other data translation and distribution methods between devices may likewise be performed according to the method provided in this embodiment. Data translation and distribution in the heterogeneous link may be carried out concurrently, that is, data translation and distribution among multiple devices may be carried out simultaneously. The data in the heterogeneous link may be sent in a one-to-one manner, or in a one-to-many manner, or in a many-to-many manner. However, no matter which data translation and distribution requirements are needed, after original data to be sent are parsing, the heterogeneous link routing table is queried, then corresponding protocol parsing codes are matched, the protocol conversion of the data is realized, and then distribution of the data is realized according to the heterogeneous link routing table.

Since the heterogeneous link table is independently stored in the heterogeneous link data translation and distribution system, when a new device is accessed into the heterogeneous link data translation and distribution system, only the heterogeneous link table needs to be updated, and the heterogeneous link data translation and distribution system may be expanded. In addition, due to the existence of the heterogeneous link routing table, the data transfer and distribution can be conducted in parallel, and the addition of devices does not add too much load to the heterogeneous link data translation and distribution system. Of course, protocol parsing codes between protocols need to be stored in addition to heterogeneous link routing table in the heterogeneous link data translation and distribution system.

According to the heterogeneous link data translation and distribution method provided in this embodiment, after the original data sent by the first device in the heterogeneous link is received, the heterogeneous link routing table is queried according to the original data to obtain the routing information and the data protocol information of the second device to be connected to the first device; the original data is translated into the data to be distributed conforming to the data protocol information of the second device; and the data to be distributed is sent to the second device according to the routing information of the second device, whereby the data translation and distribution in the heterogeneous link are realized, and the data translation and distribution function in the heterogeneous link may be easily expanded due to the adoption of the form of the heterogeneous link routing table to realize the data translation and distribution, so that the method is suitable for a data transmission system with higher and higher system integration level.

Figure 2:
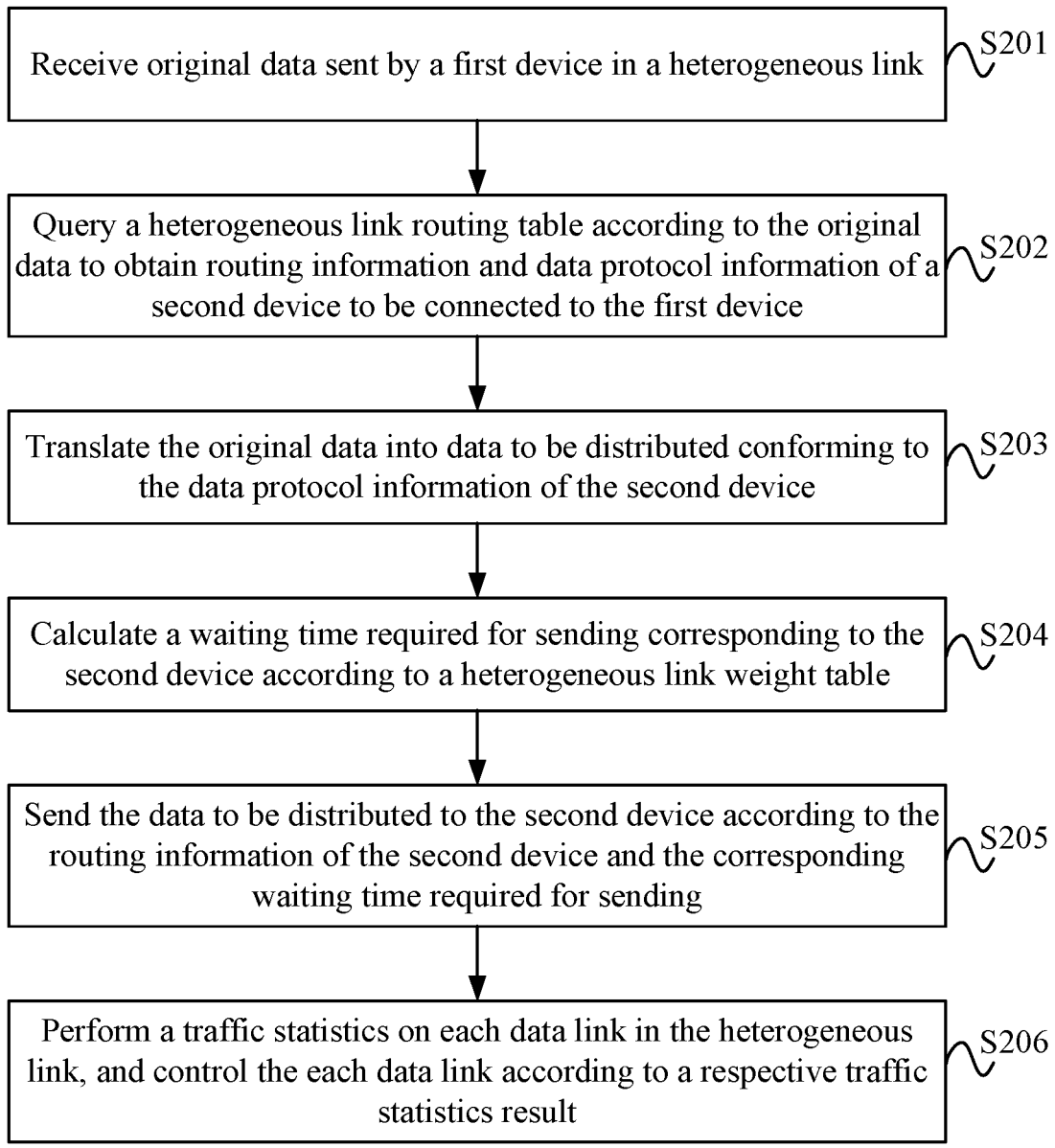
FIG. 2 is a flowchart of a heterogeneous link data translation and distribution method provided in another embodiment of the present disclosure.

It should be noted that, in the related art, a concentrator typically sends data to all devices connected to the concentrator in a heterogeneous network in a frequency/time division manner, but cannot send data to only one or more specific devices, and thus cannot realize concurrence of multiple converted data, and, when the device is expanded in the heterogeneous network, the concentrator usually needs to be reset in a stopped state, so that the expansion of the device is also inconvenient. In the embodiments of the present disclosure, the heterogeneous link routing table is queried, not only the data protocol information of the second device may be acquired, but also the routing information of the second device may be acquired, and the data to be distributed may be directionally sent to the specific device by utilizing the routing information, therefore, in the embodiments of the present disclosure, the concurrency of data to be converted is realized, and in a case where the device needs to be expanded, since routing information of a non-newly-added device does not need to be changed in the heterogeneous link routing table, so that the device may be conveniently expanded in the embodiments of the present disclosure. FIG. 2 is a flowchart of a heterogeneous link data translation and distribution method provided in another embodiment of the present disclosure, as shown in FIG. 2, a heterogeneous link data translation and distribution method provided in this embodiment includes described below.

In step S201, original data sent by a first device in a heterogeneous link is received.

In step S202, a heterogeneous link routing table is queried according to the original data to obtain routing information and data protocol information of a second device to be connected to the first device.

In step S203, the original data is translated into data to be distributed conforming to the data protocol information of the second device.

The contents in the steps S201 to S203 may be correspondingly referred to the steps S101 to S103 in the foregoing embodiment, which are not repeated here.

In step S204, a waiting time required for sending corresponding to the second device is calculated according to a heterogeneous link weight table.

Due to the limitation of a link transmission bandwidth, the data distribution may be bottlenecked and thus the data forwarding may be affected in the heterogeneous link when a number of devices increases and concurrent data translation and distribution requirements are high. Therefore, the data distribution needs to be optimized by adopting a certain mechanism. After various data protocols in the heterogeneous link are analyzed, it can be seen that transmission environments required by the various data protocols are different, and the requirements for transmission parameters such as a bandwidth and a time delay are also different. Therefore, in this embodiment, a weight table corresponding to a communication speed of each link may be established according to the characteristics of various different links in the heterogeneous link. After the original data sent by the first device is received, the waiting time required for sending corresponding to the second device needs to be calculated according to the weight table. The waiting time required for sending corresponding to the second device represents the tolerable waiting time required for sending between the original data sent by the first device and the data to be distributed received by the second device. For example, waiting time required for sending required by in-board communication buses such as SPI and IIC is shorter, and waiting time required for sending required by industrial communication buses such as UART and CAN may be longer. Therefore, after translation from the original data to the data to be distributed is completed, the data to be distributed is not distributed immediately, but the data to be distributed is sent after the waiting time required for sending corresponding to the second device is calculated according to the weight table and the waiting time required for sending arrives. In this way, a problem that a link bandwidth cannot complete data distribution in time when a large amount of concurrent data in the heterogeneous link occurs at the same time is avoided. Data protocol settings with higher data transmission time requirements may be weighted higher, while data protocol settings with lower data transmission time requirements may be weighted higher. In addition, waiting time can be independently set for transmission links which individually need to improve the highest response speed of the current system.

In some embodiments, the step in which the waiting time required for sending corresponding to the second device is calculated according to the heterogeneous link weight table includes: a weight parameter of a data link corresponding to the second device is acquired from the heterogeneous link weight table; where the weight parameter of the data link includes a waiting time required for idling of a data link channel and a weight of the data link; and the waiting time required for sending corresponding to the second device is calculated according to a formula $$T_w = \frac{\delta \times T_B \times W}{P},$$

where $T_w$ is the waiting time required for sending corresponding to the second device, and the unit is ms. $\delta$ is a system communication constant, $T_B$ is the waiting time required for idling of the data link channel corresponding to the second device, and the unit is ms. W is the weight of the data link corresponding to the second device. The weight of each link in the heterogeneous link may be obtained by combining the proportion conversion of the business based on the waiting time of different links. P is a number of communication packets of a link corresponding to the second device in unit time, and the number of communication packets is the more, the waiting time is the shorter. The waiting time scheduling algorithm provided by the above formula mainly realizes the data acquisition and translation of each communication link, and considers the distribution time limitation, and the dynamic communication adjustment is given for different application scenes and conditions, so that the timeliness of distribution is realized while the CPU occupancy is reduced.

In some embodiments, in order to enable calculation of the waiting time required for sending, the heterogeneous link data translation and distribution system may also perform a statistic on information such as a number of bytes of data received and sent over each link, a number of data packets, the most recent received and sending time of data, and a number of data sent per unit time in the heterogeneous link. The data statistic function is a data source for realizing the scheduling algorithm and is also used for detecting the performance of the translation and distribution system.

It should be noted that according to steps S201 to S204 of this embodiment, in this embodiment, the data to be distributed is sent to the second device according to the waiting time required for sending corresponding to the second device, so that the data distribution may be optimized, and thus, a situation that the data forwarding is affected by a bottleneck occurring in a data distribution process may be avoided.

In step S205, the data to be distributed is sent to the second device according to the routing information of the second device and the corresponding waiting time required for sending.

After the waiting time required for sending corresponding to the second device is calculated, the data to be distributed may be sent to the second device in a planned manner according to the waiting time. In this way, the data transmission pressure on the system when a large amount of concurrent data in the heterogeneous link occurs may be relieved, and the data translation and distribution capacity of the heterogeneous link data translation and distribution system may be improved.

After the practical testing of the heterogeneous link data translation and distribution method provided herein, it is found that data forwarding in the heterogeneous link takes less than 1 ms, which is five times faster than the 5 ms required by a dbus protocol for inter-process communication.

Due to the existence of multiple devices in the heterogeneous link, when the data translation and distribution requirements is higher and higher, a transmission bottleneck may still occur, and therefore, in order to solve a problem existing in the data translation and distribution in the heterogeneous link, an embodiment of the present disclosure further provides a data transmission protocol in the heterogeneous link. When each device in the heterogeneous link applies this data transmission protocol, conversion of the data protocol between the devices is not needed, and the data transmission speed in the heterogeneous link may be improved. A data span of the data transmission protocol provided in the embodiments of the present disclosure is shown in table 2.

TABLE 2

| Separated layer | | | | | | |
|---|---|---|---|---|---|---|
| Application layer | MQTT/IEC61850 | | | | | Vianoproto |
| Transport layer | TCP/UDP | | TCP MODBUS | | | |
| Network layer | IP | | | | | |
| Several chain layers | 802 | | modbus | Can | | |
| Physical layer | Network | | | Bus between boards | | On-board bus |
| | Wifi | Bluetooth Zigbee | Uart | Can | 433M | IIC Spi Sdio |

In the data transmission protocol design shown in table 2, several of following elements are considered.

1. A fixed byte is adopted as a header, so that an effective message may be rapidly discriminated, and the information of a data link layer subjected to electromagnetic interference may be rapidly eliminated through the change of a data bit of a header byte itself. On a certain level, information stability of a circuit in a strong electromagnetic interference environment is guaranteed.

2. The adoption of a header check with a cyclic redundancy check (CRC) 16 may avoid error codes for a particular link.

3. A ping packet by referring to an IP protocol is used for the protocol forwarding speed measurement.

4. A receiving and transmitting sequence number by referring to a transmission control protocol (TCP) is used for guaranteeing the correctness and timeliness of the data.

5. A device model is built by referring to the modeling of an International Electrotechnical Commission (IEC) 61850 protocol.

6. A timeout mechanism and a data window is formulated by referring to a K/W mechanism of a power grid protocol IEC104 protocol.

7. A retransmission mechanism is formulated by referring to the quality of service (QOS) mechanism of a message queuing telemetry transport (MQTT) protocol.

8. A broadcast function is formulated by referring to a broadcast mechanism of a user datagram protocol (UDP).

9. A subpackaging requirement is formulated by referring to a subpackaging function of the IP.

10. A response mechanism is formulated by referring to a receiving and sending response of the TCP.

The heterogeneous link data translation and distribution method provided in the embodiments of the present disclosure further includes described below.

In step S206, a traffic statistics is performed on each data link in the heterogeneous link, and the each data link is controlled according to a respective traffic statistics result. The traffic statistics includes a number of data bytes and data packets received and sent on each data link in the heterogeneous link, latest receiving and sending time of the data and the like.

In some embodiments, after the traffic statistics is performed on the each data link in the heterogeneous link, the each data link may also be controlled according to the traffic statistics results. The step in which the each data link is controlled according to the traffic statistics results includes: a traffic management and control of different thresholds is performed on each data link of data links with traffic less than or equal to a traffic threshold in conjunction with routing table configuration information; and early warning information is sent for a data link with traffic exceeding the traffic threshold, and a cutting-off operation or a waiting for recovery operation is performed, therefore, operations such as statistics, monitoring and the like of various data links in the heterogeneous link may be realized.

It should be noted that the traffic statistics are distinguished from the traffic statistics performed by the distribution policy when performing the data distribution, where the traffic statistics, based on the traffic data for each data link, serves a traffic control for each data link, and the traffic statistics may include that statistics on link information such as a total net input traffic/total net output traffic of each link, a specific data message, a number of total output failure message/input failure message, a number of total timeout message.

The traffic management and control of different thresholds is performed on each data link according to traffic statistical information and in conjunction with the routing table configuration information. For the data link with traffic exceeding the traffic threshold, the early warning information is sent, and the cutting-off operation or the waiting for recovery operation is performed; a link which is about to exceed the traffic threshold is found, and a corresponding device is informed in a reporting and early warning notification manner of the traffic statistical information; for a link which exceeds the traffic threshold, the cutting off automatically is performed, a corresponding message information is not transmitted again, or the waiting for recovery operation is performed, namely, the data transmission is firstly paused and after certain interval of time, a corresponding data link communication is recovered again. According to this embodiment, the stability of the system can be guaranteed by the cutting-off operation or the waiting for recovery operation on the data link with traffic exceeding the traffic threshold. The manner of sending the early warning information may be notification or log storage through a specific message.

A user may set the traffic threshold and a fault isolation manner (the fault isolation manner is direct cut-off or waits for recovery (namely data transmission is recovered after waiting for a period of time)). For a system with a human-computer interface, corresponding configuration information may be looked up and modified in real time, and hot loading of the system is realized.

The hot loading of the system refers to a manner that the current system information is backed up in real time, a real-time configuration is loaded into a memory, and original old version configuration information is replaced, so that a mode that the system does not need to be powered off or shut down is realized, and further zero-time-consumption switching is realized.

In some embodiments, the heterogeneous link data translation and distribution method provided in the embodiments of the present disclosure further includes: routing information and data protocol information of a newly added device are loaded in the heterogeneous link routing table through a dynamic library; or routing information and data protocol information of a newly added device are added in real time in the heterogeneous link routing table in a process communication manner.

Since various protocols in the network may be updated at any time, a heterogeneous link routing table page needs to be updated in a certain manner. According to the heterogeneous link data translation and distribution method provided in the embodiments of the present disclosure, on the basis of adopting a unique netlink communication manner of linux, a forwarding system and different protocol parsing modules are separated into independent program modules, so that a hot loading of a newly added protocol may be realized, and therefore the hot loading of a system is realized when a new protocol module is newly added. There are two implementations of this module, which are respectively as follows.

The routing information and the data protocol information of the newly added device are loaded in the heterogeneous link routing table through the dynamic library, that is, the hot updating of the heterogeneous link routing table is realized according to a pre-realized function simple entity in the dynamic library. Or the routing information and the data protocol information of the newly added device are added in real time in the heterogeneous link routing table in the process communication manner, that is, a process of the protocol parsing module is added in real time; the heterogeneous link routing table is updated in the two manners, so that the effect that the system does not need to be restarted during updating can be realized.

According to the heterogeneous link data translation and distribution method provided in the embodiments of the present disclosure, the waiting time required for sending corresponding to the second device is calculated according to the heterogeneous link weight table, and the data to be distributed is sent to the second device according to the routing information of the second device and the corresponding waiting time required for sending, whereby the time limitation of the data distribution is considered while the data acquisition and translation of each data link is realized, a dynamic communication adjustment is given to different application scenes and conditions, and the timeliness of distribution is realized while the CPU occupancy is reduced; moreover, the step in which the each data link is controlled according to the traffic statistics results, includes that the traffic management and control of different thresholds is performed on each data link of data links with traffic less than or equal to the traffic threshold in conjunction with the routing table configuration information; and the early warning information is sent for the data link with traffic exceeding the traffic threshold, and the cutting-off operation or the waiting for recovery operation is performed, so that the stability of the system is ensured.

Figure 3:
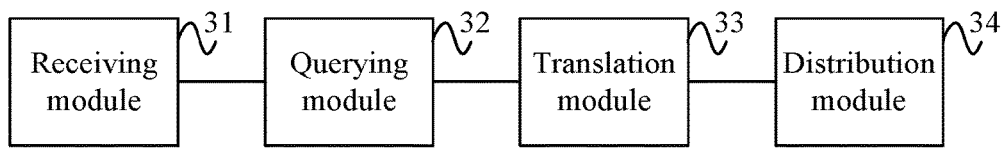
FIG. 3 is a schematic structural diagram of a heterogeneous link data translation and distribution system provided in an embodiment of the present disclosure.

FIG. 3 is a schematic structural diagram of a heterogeneous link data translation and distribution system provided in an embodiment of the present disclosure, as shown in FIG. 3, and the heterogeneous link data translation and distribution system provided in this embodiment includes a receiving module 31, a querying module 32, a translation module 33 and a distribution module 34.

The receiving module 31 is configured to receive original data sent by a first device in a heterogeneous link.

The querying module 32 is configured to query a heterogeneous link routing table according to the original data to obtain routing information and data protocol information of a second device to be connected to the first device.

The translation module 33 is configured to translate the original data into data to be distributed conforming to the data protocol information of the second device.

The distribution module 34 is configured to send the data to be distributed to the second device according to the routing information of the second device.

The heterogeneous link data translation and distribution system provided in this embodiment is used for implementing the heterogeneous link data translation and distribution method shown in FIG. 1, with similar implementation principles and technical effects, which are not repeated here.

On the basis of the embodiment shown in FIG. 3, the querying module 32 is further configured to calculate a waiting time required for sending corresponding to the second device according to a heterogeneous link weight table; and the distribution module 33 is configured to send the data to be distributed to the second device according to the routing information of the second device and the waiting time required for sending corresponding to the second device.

On the basis of the embodiment shown in FIG. 3, the querying module 32 is further configured to acquire a weight parameter of a data link corresponding to the second device from the heterogeneous link weight table; where the weight parameter of the data link includes waiting time required for idling of a data link channel and a weight of the data link; and the waiting time required for sending corresponding to the second device is calculated according to a formula $$T_w = \frac{\delta \times T_B \times W}{P},$$

where $T_w$ is the waiting time required for sending corresponding to the second device, $T_B$ is the waiting time required for idling of the data link channel corresponding to the second device, W is the weight of the data link corresponding to the second device, and P is a number of data packets of a data link corresponding to the second device in unit time, and $\delta$ is a system communication constant.

The heterogeneous link data translation and distribution system provided in this embodiment includes: the receiving module configured to receive the original data sent by the first device in the heterogeneous link; the querying module 32 configured to query the heterogeneous link routing table according to the original data to obtain the routing information and the data protocol information of the second device to be connected to the first device; the translation module configured to translate the original data into the data to be distributed conforming to the data protocol information of the second device; and the distribution module configured to send the data to be distributed to the second device according to the routing information of the second device, whereby the data translation and distribution in the heterogeneous link are realized, and the data translation and distribution function in the heterogeneous link may be easily expanded due to the adoption of the form of the heterogeneous link routing table to realize the data translation and distribution, so that the method is suitable for a data transmission system with higher and higher system integration level.

Figure 4:
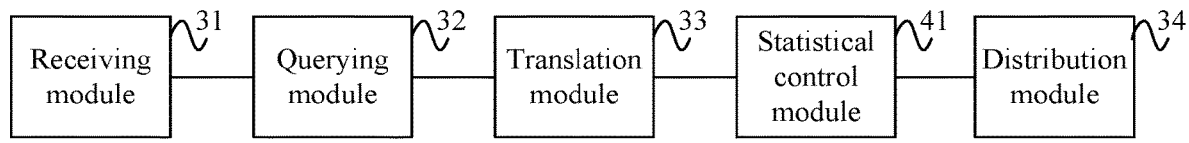
FIG. 4 is a schematic structural diagram of a heterogeneous link data translation and distribution system provided in another embodiment of the present disclosure.

FIG. 4 is a schematic structural diagram of a heterogeneous link data translation and distribution system provided in another embodiment of the present disclosure, as shown in FIG. 4, the heterogeneous link data translation and distribution system provided in this embodiment further includes, on the basis of FIG. 3, a statistical control module 41. The statistical control module 41 is configured to perform a traffic statistics on each data link in the heterogeneous link and control the each data link according to a respective traffic statistics result.

On the basis of the embodiment shown in FIG. 4, the statistical control module 41 is configured to: performing a traffic management and control of different thresholds on each data link of data links with traffic less than or equal to a traffic threshold in conjunction with routing table configuration information; and send early warning information for a data link with traffic exceeding the traffic threshold, and perform a cutting-off operation or a waiting for recovery operation.

On the basis of the embodiment shown in FIG. 3 or FIG. 4, the heterogeneous link data translation and distribution system further includes an update module. The update module is configured to: load routing information and data protocol information of a newly added device in the heterogeneous link routing table through a dynamic library; or add routing information and data protocol information of a newly added device in real time in the heterogeneous link routing table in a process communication manner.

According to the heterogeneous link data translation and distribution system provided in the embodiments of the present disclosure, the waiting time required for sending corresponding to the second device is calculated according to the heterogeneous link weight table, and the data to be distributed is sent to the second device according to the routing information of the second device and the corresponding waiting time required for sending, whereby the time limitation of the data distribution is considered while the data acquisition and translation of each data link is realized, a dynamic communication adjustment is given to different application scenes and conditions, and the timeliness of distribution is realized while the CPU occupancy is reduced; moreover, the step in which the each data link is controlled according to the traffic statistics results, includes that the traffic management and control of different thresholds is performed on the each data link of data links with traffic less than or equal to the traffic threshold in conjunction with the routing table configuration information; and the early warning information is sent for the data link with traffic exceeding the traffic threshold, and the cutting-off operation or the waiting for recovery operation is performed, so that the stability of the system is ensured.

Figure 5:
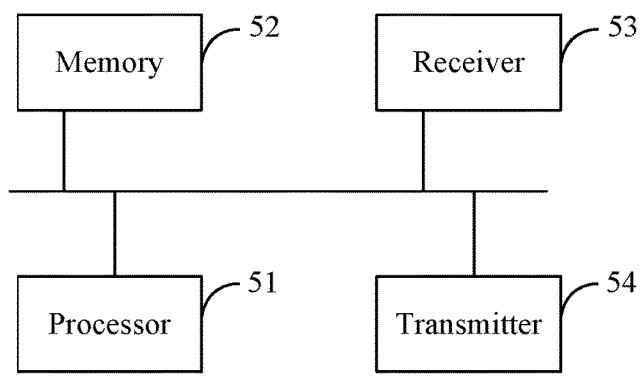
FIG. 5 is a schematic structural diagram of a heterogeneous link data translation and distribution device provided in an embodiment of the present disclosure.

FIG. 5 is a schematic structural diagram of a heterogeneous link data translation and distribution device provided in an embodiment of the present disclosure, as shown in FIG. 5, the heterogeneous link data translation and distribution device includes a processor 51, a memory 52, a receiver 53, and a transmitter 54; the processor 51 in the heterogeneous link data translation and distribution device may include one or more processors, with one processor 51 as an example in FIG. 5; the processor 51, the memory 52, the receiver 53, and the transmitter 54 in the heterogeneous link data translation and distribution device may be connected by a bus or other manners, for example by a bus in FIG. 5.

The memory 52, as a computer-readable storage medium, may be configured to store software programs, computer-executable programs, and modules, such as program instructions/modules corresponding to the heterogeneous link data translation and distribution method in the embodiment shown in FIG. 1 herein (such as a receiving module (31), a querying module (32), a translation module (33), and a distribution module (34) in the heterogeneous link data translation and distribution device). The processor 51 executes software programs, instructions, and modules stored in the memory 52 so as to apply various functions and data processing of the heterogeneous link data translation and distribution device, i.e., so as to implement the heterogeneous link data translation and distribution method described above.

The memory 52 may mainly include a stored program region and a stored data region, where the stored program region may store an operating system, an application program required for at least one function; the storage data region may store data created from use of the heterogeneous link data translation and distribution device. In addition, the memory 52 may include a high-speed random access memory and may further include a non-volatile memory, such as at least one magnetic disk storage device, flash memory device, or other non-volatile solid-state memory device.

The receiver 53 is a combination of any one or more devices or modules having data receiving capability, and the transmitter 54 is a combination of any one or more devices or modules having data transmitting capability.

An embodiment of the present disclosure further provides a non-transitory storage medium containing a computer-executable instruction, the computer-executable instruction, when executed by a computer processor, are configured to perform a heterogeneous link data translation and distribution method, the method includes: original data sent by a first device in a heterogeneous link is received; a heterogeneous link routing table is queried according to the original data to obtain routing information and data protocol information of a second device to be connected to the first device; the original data is translated into data to be distributed conforming to the data protocol information of the second device; and the data to be distributed is sent to the second device according to the routing information of the second device.

Of course, an embodiment of the present disclosure provides a non-transitory storage medium containing a computer-executable instruction, where the computer-executable instruction may further perform relevant operations of the heterogeneous link data translation and distribution method provided in any of the embodiments of the present disclosure.

Through the description of the above embodiments, those skilled in the art may clearly understand that the present disclosure may be implemented by means of software and necessary universal hardware, and of course, may also be implemented by means of hardware, but in many cases the former is a better implementation. Based on such an understanding, the technical solutions of the present disclosure, either essentially or in terms of contributions to the related art, may be embodied in the form of a software product, which is stored in a computer readable storage medium, such as a floppy disk, a read-only memory (ROM), a random access memory (RAM), a flash memory (FLASH), a hard disk, or an optical disk of a computer, and includes several instructions for causing a computer device (which may be a personal computer, a server, or a network device, etc.) to perform the methods described in the various embodiments herein.

It should be noted that the embodiments of the heterogeneous link data translation and distribution device described above include units and modules that are only divided according to functional logic, but are not limited to the division described above, as long as the respective functions are enabled; in addition, the names of the various functional units are only for ease of distinguishing each other.

What is claimed is:

1. A heterogeneous link data translation and distribution method, comprising:
    receiving original data sent by a first device in a heterogeneous link according to a standard and a format used by the first device for data transmission;
    querying a heterogeneous link routing table according to the original data to obtain routing information and data protocol information of a second device to be connected to the first device, wherein the data protocol information comprises a standard and a format used by the second device for data transmission;
    translating the original data into data to be distributed conforming to the data protocol information of the second device; and
    sending the data to be distributed to the second device according to the routing information of the second device,
    wherein before sending the data to be distributed to the second device according to the routing information of the second device, the method further comprises:
    calculating a waiting time required for sending corresponding to the second device according to a heterogeneous link weight table; and
    wherein sending the data to be distributed to the second device according to the routing information of the second device comprises:
    sending the data to be distributed to the second device according to the routing information of the second device and the waiting time required for sending corresponding to the second device.

2. The method of claim 1, wherein calculating the waiting time required for sending corresponding to the second device according to the heterogeneous link weight table comprises:
    acquiring a weight parameter of a data link corresponding to the second device from the heterogeneous link weight table; wherein the weight parameter of the data link comprises a waiting time required for idling of a data link channel and a weight of the data link;
    calculating the waiting time required for sending corresponding to the second device according to a formula $$T_w = \frac{\delta \times T_B \times W}{P},$$

wherein $T_w$ is the waiting time required for sending corresponding to the second device, $T_B$ is the waiting time required for idling of the data link channel corresponding to the second device, W is the weight of the data link corresponding to the second device, P is a number of data packets of the data link corresponding to the second device in unit time, and δ is a system communication constant.

3. The method of claim 2, further comprising:
performing a traffic statistics on each data link in the heterogeneous link and controlling the each data link according to a respective traffic statistics result.

4. The method of claim 2, further comprising:
loading routing information and data protocol information of a newly added device in the heterogeneous link routing table through a dynamic library; or
adding routing information and data protocol information of a newly added device in real time in the heterogeneous link routing table in a process communication manner.

5. The method of claim 1, further comprising:
performing a traffic statistics on each data link in the heterogeneous link and controlling the each data link according to a respective traffic statistics result.

6. The method of claim 5, wherein controlling the each data link according to the traffic statistics results comprises:
performing a traffic management and control on each data link of data links with traffic less than or equal to a traffic threshold in conjunction with routing table configuration information; and
sending early warning information for data links with traffic exceeds the traffic threshold, and performing a cutting-off operation or a waiting for recovery operation.

7. The method of claim 1, further comprising:
loading routing information and data protocol information of a newly added device in the heterogeneous link routing table through a dynamic library; or
adding routing information and data protocol information of a newly added device in real time in the heterogeneous link routing table in a process communication manner.

8. A heterogeneous link data translation and distribution system, comprising:
a receiving module, which is configured to receive original data sent by a first device in a heterogeneous link according to a standard and a format used by the first device for data transmission;
a querying module, which is configured to query a heterogeneous link routing table according to the original data to obtain routing information and data protocol information of a second device to be connected to the first device, wherein the data protocol information comprises a standard and a format used by the second device for data transmission;
a translation module, which is configured to translate the original data into data to be distributed conforming to the data protocol information of the second device; and
a distribution module, which is configured to send the data to be distributed to the second device according to the routing information of the second device,
wherein the querying module is further configured to calculate a waiting time required for sending corresponding to the second device according to a heterogeneous link weight table; and
the distribution module is configured to send the data to be distributed to the second device according to the routing information of the second device and the waiting time required for sending corresponding to the second device.

9. A heterogeneous link data translation and distribution device, comprising:
at least one processor; and
a storage apparatus, which is configured to store at least one program, wherein the at least one program, when executed by the at least one processor, cause the at least one processor to implement the heterogeneous link data translation and distribution method of claim 1.

10. A non-transitory computer readable storage medium, having stored thereon a computer program, wherein the computer program, when executed by a processor, implements the heterogeneous link data translation and distribution method of claim 1.

* * * * *